US 12,556,628 B2

(12) United States Patent
Agrawal et al.

(10) Patent No.: US 12,556,628 B2
(45) Date of Patent: Feb. 17, 2026

(54) ELECTRONIC DEVICE THAT EXTENDS A DISPLAY IN RESPONSE TO GAZE DIRECTION AND UNVIEWED VISUAL CONTENT

(71) Applicant: MOTOROLA MOBILITY LLC, Wilmington, DE (US)

(72) Inventors: Amit Kumar Agrawal, Bangalore (IN); Rohit Sisodia, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 327 days.

(21) Appl. No.: 18/476,972

(22) Filed: Sep. 28, 2023

(65) Prior Publication Data
US 2024/0129399 A1  Apr. 18, 2024

Related U.S. Application Data

(60) Provisional application No. 63/419,994, filed on Oct. 27, 2022, provisional application No. 63/416,927, filed on Oct. 17, 2022.

(51) Int. Cl.
*H04M 1/02* (2006.01)
*G06F 3/01* (2006.01)
*G09G 3/00* (2006.01)

(52) U.S. Cl.
CPC .......... *H04M 1/0268* (2013.01); *G06F 3/013* (2013.01); *G09G 3/035* (2020.08); *H04M 1/0237* (2013.01); *H04M 1/0264* (2013.01); *G09G 2340/0464* (2013.01); *G09G 2354/00* (2013.01); *H04M 2250/12* (2013.01)

(58) Field of Classification Search
CPC .... H04M 1/0233–0239; H04M 1/0268; G06F 3/013; G06F 3/017
See application file for complete search history.

(56) References Cited

U.S. PATENT DOCUMENTS

| | | | |
|---|---|---|---|
| 11,043,191 B1 * | 6/2021 | Kang | G09G 5/10 |
| 11,838,433 B1 * | 12/2023 | Kumar Agrawal | H04M 1/0235 |
| 12,135,587 B1 * | 11/2024 | Agrawal | H04M 1/0268 |
| 12,174,672 B2 * | 12/2024 | Agrawal | G06F 1/1652 |
| 12,248,337 B2 * | 3/2025 | Kang | G06F 1/1624 |
| 12,353,249 B2 * | 7/2025 | Pailla | H04M 1/0235 |
| 12,360,564 B2 * | 7/2025 | Helot | B60K 35/223 |

(Continued)

*Primary Examiner* — Patrick F Marinelli
(74) *Attorney, Agent, or Firm* — Isidore PLLC

(57) ABSTRACT

An electronic device, method and computer program product enable an automatic increase in a size of a display to present more visual content responsive to a gaze direction. The electronic system monitors eye gaze direction. The electronic system presents a first portion of visual content on a flexible display while a flexible display support structure is at least partially retracted. In response to the visual content having an un-displayed second portion that is contiguous with the first portion and determining that the eye gaze direction has traversed the first portion towards one of a translatable edge of the flexible display support structure or an opposite edge of the first housing in a direction of the un-displayed second portion, the electronic system triggers the translation mechanism to extend the flexible display support structure. The electronic system presents the first and second portion of the visual content on an extended flexible display.

20 Claims, 12 Drawing Sheets

(56) References Cited

U.S. PATENT DOCUMENTS

| | | | |
|---|---|---|---|
| 12,399,528 B2* | 8/2025 | Chung | G06F 3/0482 |
| 12,411,546 B2* | 9/2025 | Nishiyama | G06F 3/038 |
| 2019/0235578 A1* | 8/2019 | Zhang | G06F 3/0484 |
| 2019/0261519 A1* | 8/2019 | Park | H04M 1/0235 |
| 2022/0385750 A1* | 12/2022 | Kim | H04M 1/0235 |
| 2023/0188637 A1* | 6/2023 | Cheon | H04M 1/72448 |
| | | | 455/575.4 |
| 2023/0228588 A1* | 7/2023 | Lee | G01C 21/3881 |
| | | | 701/455 |
| 2023/0259217 A1* | 8/2023 | Lee | G06F 3/017 |
| 2023/0259268 A1* | 8/2023 | Chun | G06F 3/0481 |
| | | | 715/781 |
| 2024/0098173 A1* | 3/2024 | Wu | H04M 1/72409 |
| 2024/0129392 A1* | 4/2024 | Kumar Agrawal | G06F 3/0484 |
| 2024/0129399 A1* | 4/2024 | Agrawal | H04M 1/0264 |
| 2024/0310878 A1* | 9/2024 | Pailla | H04M 1/0235 |
| 2024/0319858 A1* | 9/2024 | Cheon | G06F 3/04847 |
| 2024/0329687 A1* | 10/2024 | Dutta Choudhury | |
| | | | G06F 3/0481 |
| 2024/0329689 A1* | 10/2024 | Kim | G06F 3/0412 |
| 2024/0345630 A1* | 10/2024 | Agrawal | G06F 1/1624 |
| 2024/0365487 A1* | 10/2024 | Helot | G06F 3/1446 |
| 2024/0385436 A1* | 11/2024 | Dehkordi | G06F 3/012 |
| 2024/0411445 A1* | 12/2024 | Kang | H04M 1/0235 |
| 2024/0422252 A1* | 12/2024 | Kim | G06F 1/1624 |
| 2025/0258542 A1* | 8/2025 | Han | G06F 3/0484 |
| 2025/0278134 A1* | 9/2025 | Pastrana Vicente | G06F 3/013 |

* cited by examiner

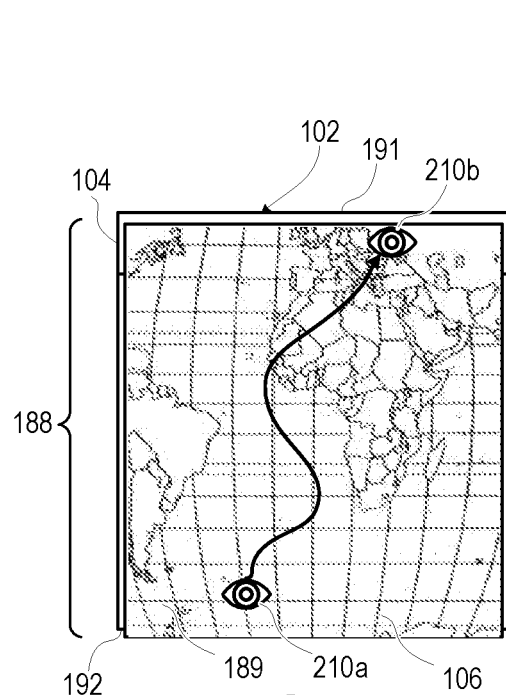 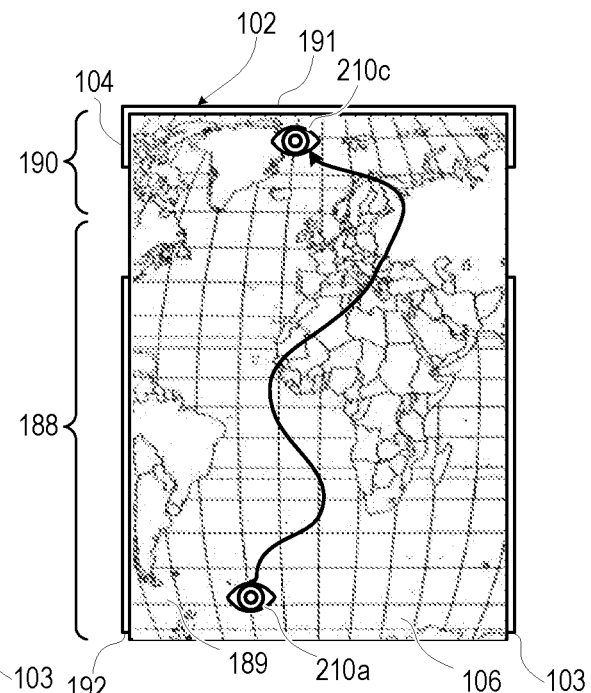
FIG. 2A    FIG. 2B
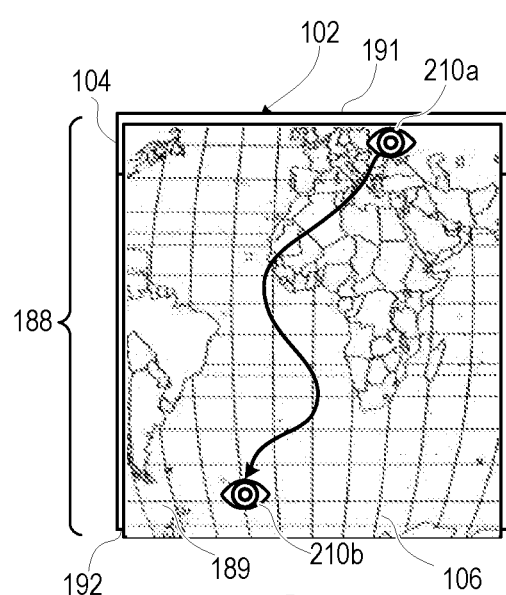 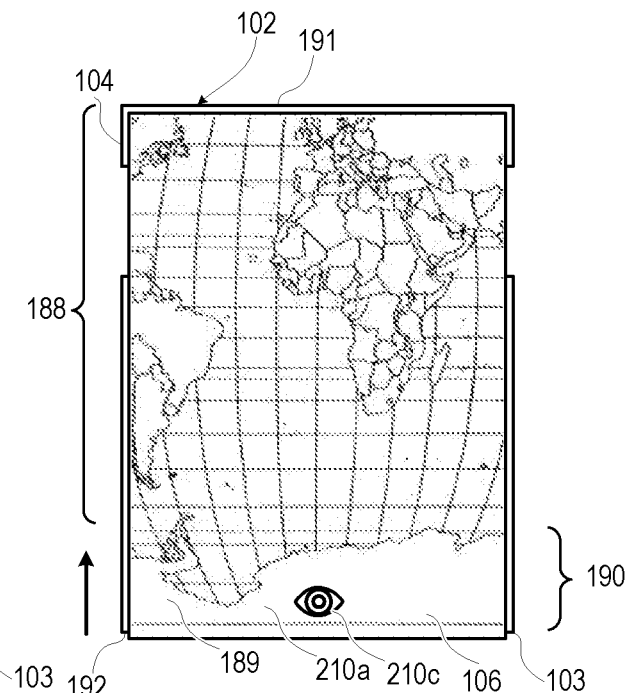
FIG. 3A    FIG. 3B

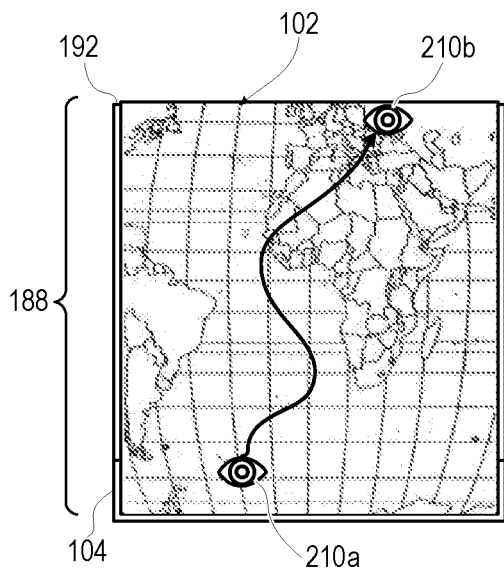
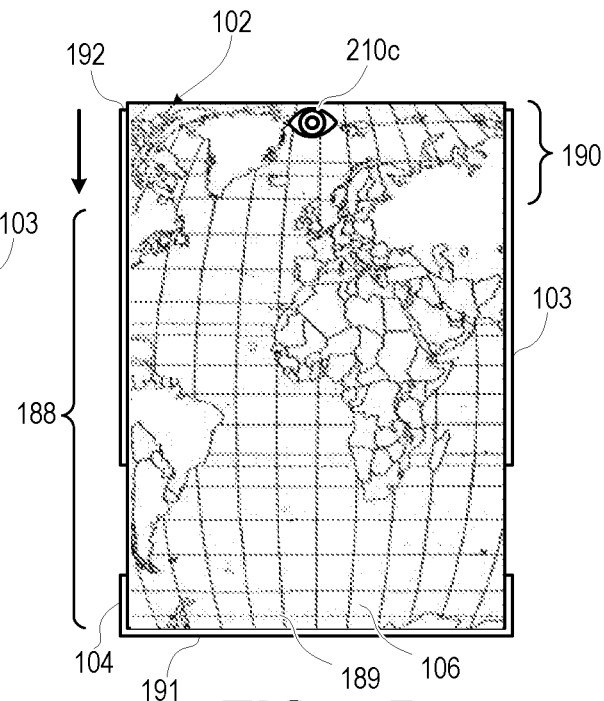
FIG. 4A  FIG. 4B
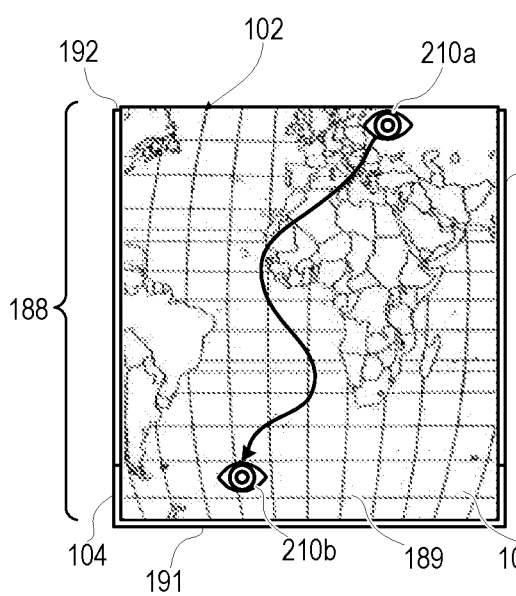
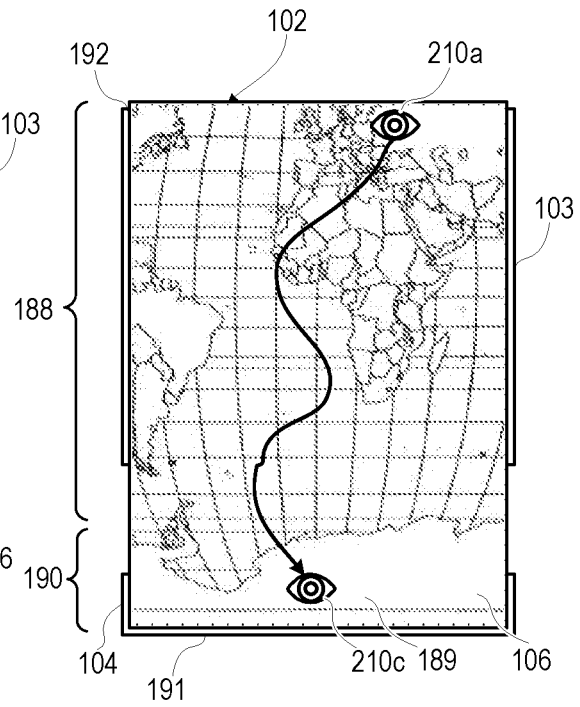
FIG. 5A  FIG. 5B

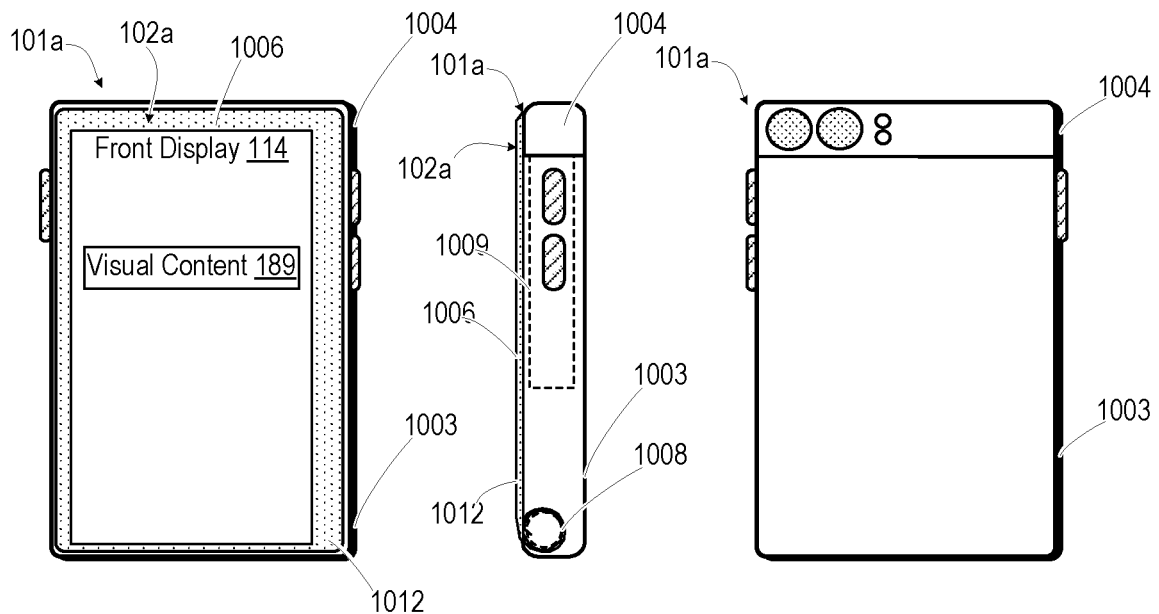
FIG. 10A  FIG. 10B  FIG. 10C
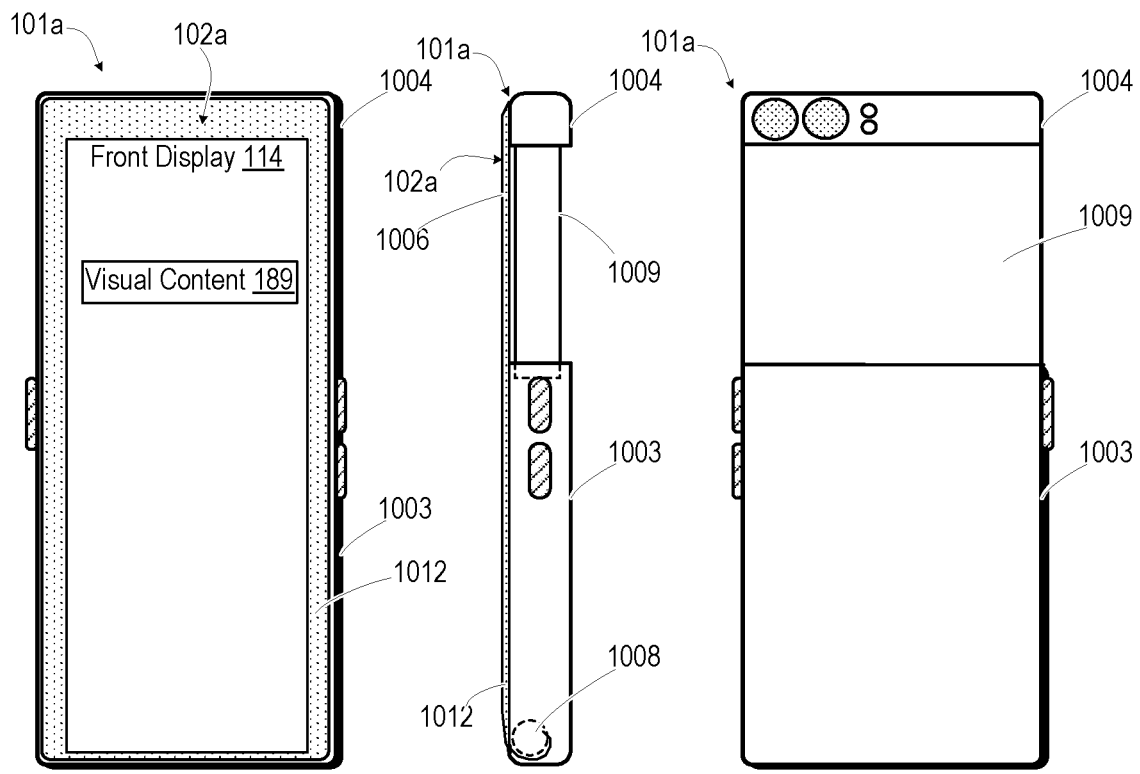
FIG. 10D  FIG. 10E  FIG. 10F

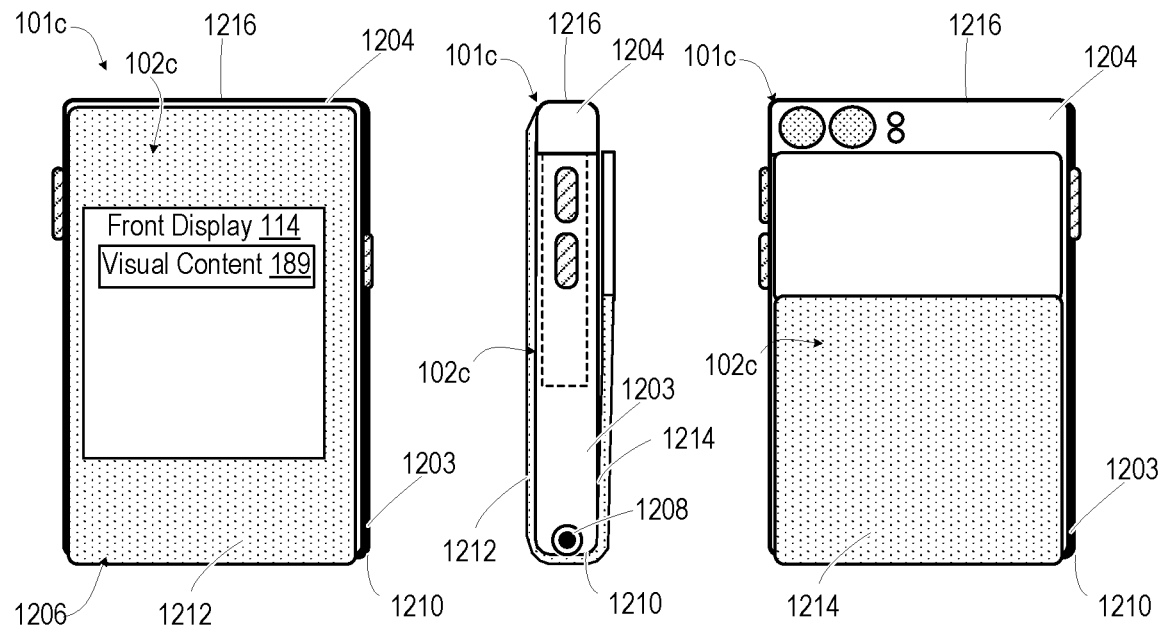
FIG. 12A  FIG. 12B  FIG. 12C
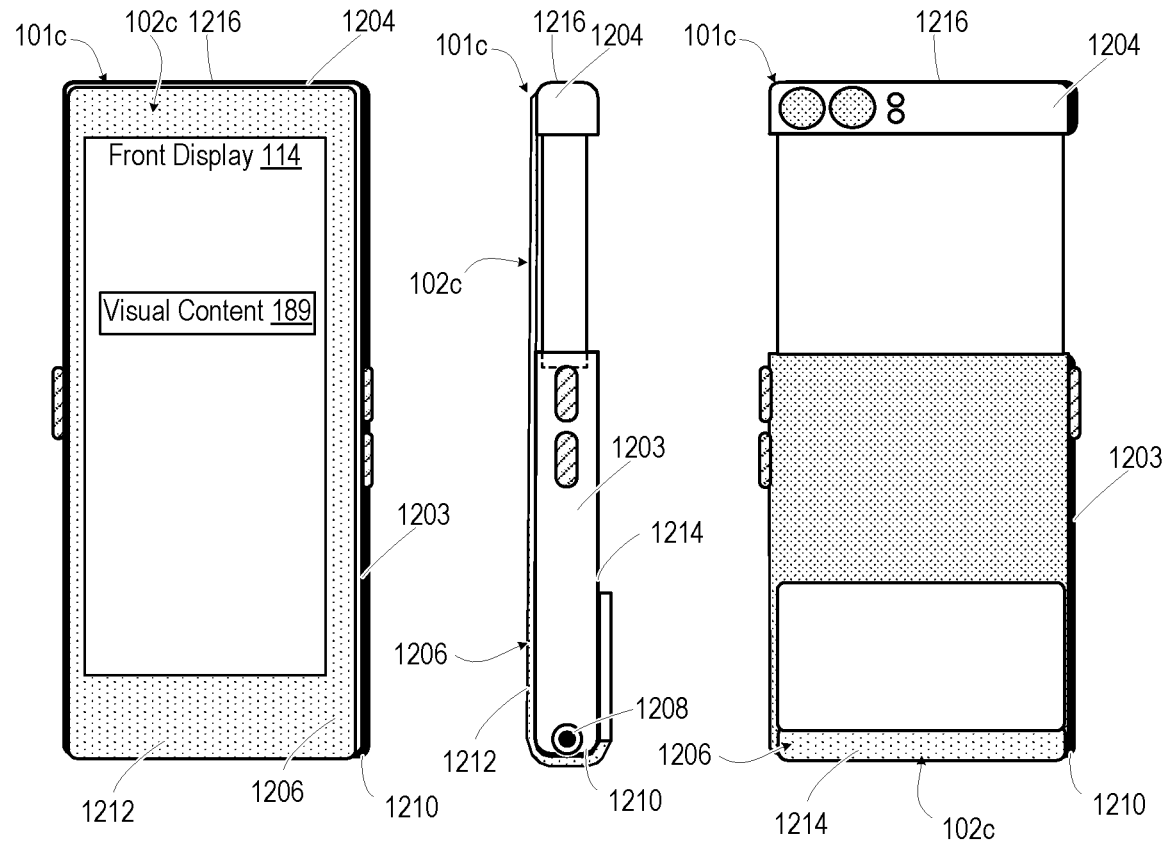
FIG. 12D  FIG. 12E  FIG. 12F

ELECTRONIC DEVICE THAT EXTENDS A DISPLAY IN RESPONSE TO GAZE DIRECTION AND UNVIEWED VISUAL CONTENT

BACKGROUND

1. Technical Field

The present disclosure relates generally to electronic devices with a graphical display, and more particularly to electronic devices having an extendable graphical display.

2. Description of the Related Art

Portable electronic communication devices, particularly smartphones, have become ubiquitous. People all over the world use such devices to stay connected. These devices have been designed in various mechanical configurations. Conventionally, these communication devices each have a rigid display disposed along a major face of the communication device. One recent configuration of handheld portable electronic devices incorporates rollable or scrollable flexible displays, where the displays extend or retract via a telescoping housing or via a sliding blade that either rolls the flexible display onto a back of the device housing or extends the flexible display from a front side of the device housing.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2A is a front view of the extendable display of FIG. 1 in a retracted position and oriented to expand upwardly and annotated with an eye gaze that traverses upward over visual content of a map, according to one or more embodiments;

FIG. 2B is a front view of the extendable display of FIG. 2A in an upward extended position to enable continued upward gaze toward a correspondingly added upper portion of the map, according to one or more embodiments;

FIG. 3A is a front view of the extendable display of FIG. 1 in a retracted position and oriented to expand upwardly and annotated with an eye gaze that traverses downward over visual content of the map, according to one or more embodiments;

FIG. 3B is a front view of the extendable display of FIG. 3A in the upwardly extended position enable continued downward gaze toward a correspondingly added lower portion of the map, according to one or more embodiments;

FIG. 4A is a front view of the extendable display of FIG. 1 in a retracted position and oriented to expand downwardly and annotated with an eye gaze that traverses upward over visual content of the map, according to one or more embodiments;

FIG. 4B is a front view of the extendable display of FIG. 4A in a downward extended position to enable continued upward gaze toward a correspondingly added upper portion of the map as the map shifts down, according to one or more embodiments;

FIG. 5A is a front view of the extendable display of FIG. 1 in a retracted position and oriented to expand downwardly and annotated with an eye gaze that traverses downward over visual content of the map, according to one or more embodiments;

FIG. 5B is a front view of the extendable display of FIG. 5A in the downward extended position to enable continued downward gaze toward a correspondingly added lower portion of the map, according to one or more embodiments;

FIG. 10A is a front view of a second example communication device having a flexible display support structure implemented as a telescoping housing that is in a retracted position supporting a flexible display having a remaining portion that scrolls, according to one or more embodiments;

FIG. 10B is a left side view of the second example communication device of FIG. 10A having the telescoping housing in the retracted position, according to one or more embodiments;

FIG. 10C is a back view of the second example communication device of FIG. 10A having the telescoping housing in the retracted position, according to one or more embodiments;

FIG. 10D is a front view of the second example communication device of FIG. 10A with the telescoping housing in an extended position, according to one or more embodiments;

FIG. 10E is a left side view of the second example communication device of FIG. 10A having the telescoping housing in the extended position, according to one or more embodiments;

FIG. 10F is a back view of the second example communication device of FIG. 10A having the telescoping housing in the extended position, according to one or more embodiments;

FIG. 12A is a front view of a third example communication device having a flexible display support structure implemented as a telescoping housing that is in a retracted position supporting a flexible display having a front portion positioned on the front housing area and a remaining portion that rolls onto a back of a first housing, according to one or more embodiments;

FIG. 12B is a left side view of the third example communication device of FIG. 12A having the telescoping housing in the retracted position, according to one or more embodiments;

FIG. 12C is a back view of the third example communication device of FIG. 12A having the telescoping housing in the retracted position, according to one or more embodiments;

FIG. 12D is a front view of the third example communication device of FIG. 12A with the telescoping housing in an extended position, according to one or more embodiments;

FIG. 12E is a left side view of the third example communication device of FIG. 12A having the telescoping housing in the extended position, according to one or more embodiments;

FIG. 12F is a back view of the third example communication device of FIG. 12A having the telescoping housing in the extended position, according to one or more embodiments.

DETAILED DESCRIPTION

Figure 1:
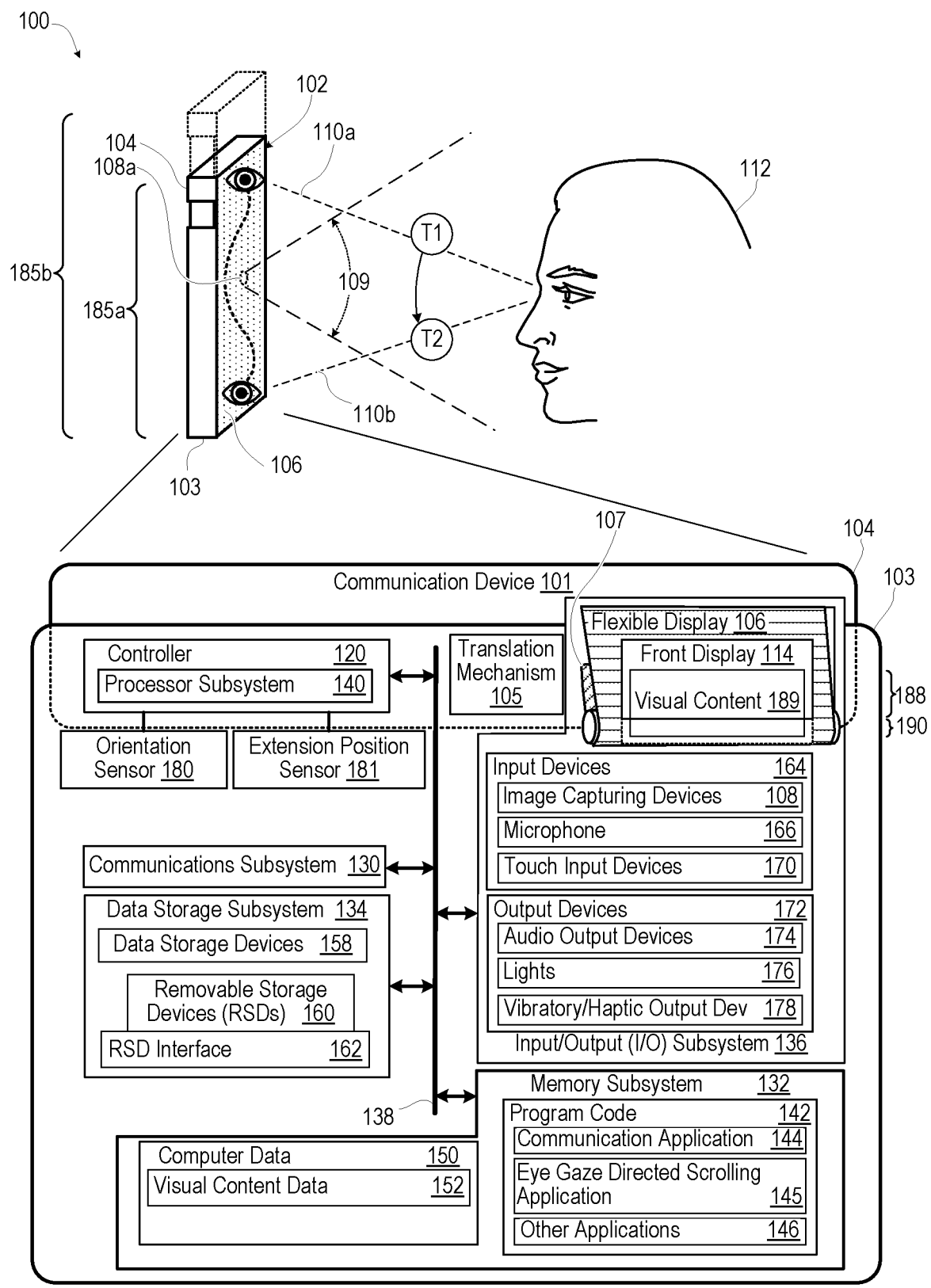
FIG. 1 presents a simplified functional block diagram and three-dimensional views of an electronic system of a communication device that controls an integrated or external extendable display using eye gaze automatic extension, according to one or more embodiments.

According to aspects of the present disclosure, an electronic device, a method, and a computer program product respond to an eye gaze direction at an edge position of an extendable display by automatically extending the display to present more visual content responsive to the gaze direction of a user. The eye gaze direction is interpreted as a scrolling or panning gesture toward previously un-displayed visual content that is presented when the display is expanded in the direction of the eye gaze. In one or more embodiments, an electronic system includes a first housing having a front side and a back side. The electronic system includes a flexible display support structure moveably attached to and positionable on the first housing to move a distal edge between a retracted position and an extended position relative to the first housing. At least one image capturing device is positioned to have a field of view of the front side of the first housing. A flexible display is coupled to the flexible display support structure across a front side of the first housing to present a larger portion of the flexible display as a front display on the front side, while the flexible display support structure is in the extended position. While the flexible display support structure is in the retracted position, a smaller portion of the flexible display is displayed as the front display on the front side, and a remaining portion of the flexible display is either: (i) scrolled up inside of the first housing; or (ii) rolled back providing a back display on the back side of the first housing. A translation mechanism is operable to position the flexible display support structure between the retracted position and the extended position. A position sensor is configured to detect a position of the flexible display support structure relative to the first housing. A controller of the electronic system is communicatively coupled to the flexible display, the at least one image capturing device, the translation mechanism, and the position sensor. The controller monitors eye gaze direction of a user positioned in the field of view of the at least one image capturing device. The controller presents a first portion of visual content on the flexible display while the flexible display support structure is in an at least partially retracted position. In response to the visual content having an un-displayed second portion that is contiguous with the first portion and determining that the eye gaze direction has at least partially traversed the first portion of the visual content towards one of a translatable edge of the flexible display support structure or an opposite edge of the first housing in a direction of the un-displayed second portion, the controller triggers the translation mechanism to extend the flexible display support structure to translate an additional portion of the flexible display to the front portion. The controller presents the first portion and a second portion of the visual content on an extended flexible display comprising the additional portion.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic system that includes or is wholly provided by an electronic device, in which the features of the present disclosure are advantageously implemented for using eye gaze automatic extension of an extendable display. In one or more embodiments, the electronic device includes additional communications functionality as communication device 101 to operate as a mobile user device in communication environment 100. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices.

Communication device 101 controls extendable display 102 that includes first housing 103 having a front side and a back side. Flexible display support structure 104 is moveably attached to and positionable on first housing 103 between a retracted position and an extended position relative to first housing 103. In one or more embodiments, translation mechanism 105 moves flexible display support structure 104 relative to first housing 103 between the retracted position and one or more extended positions. Flexible display 106 is coupled across at least a front face of first housing 103 and flexible display support structure 104. Communication device 101 presents a larger portion of flexible display 106, while flexible display support structure 104 is in the extended position, and presents a smaller portion of flexible display 106, while flexible display support structure 104 is in the retracted position. Remaining portion 107 of flexible display 106 is scrolled up or rolled back while in the retracted position. At least one image capturing device 108 is positioned to have a field of view 109 of the front side of first housing 103 to capture eye gaze direction 110a, at time T1, and eye gaze direction 110b, at time T2, of user 112 viewing front display 114 of flexible display 106. In an example embodiment, image capturing device 108a is a camera under display (CUD).

Figure 13A:
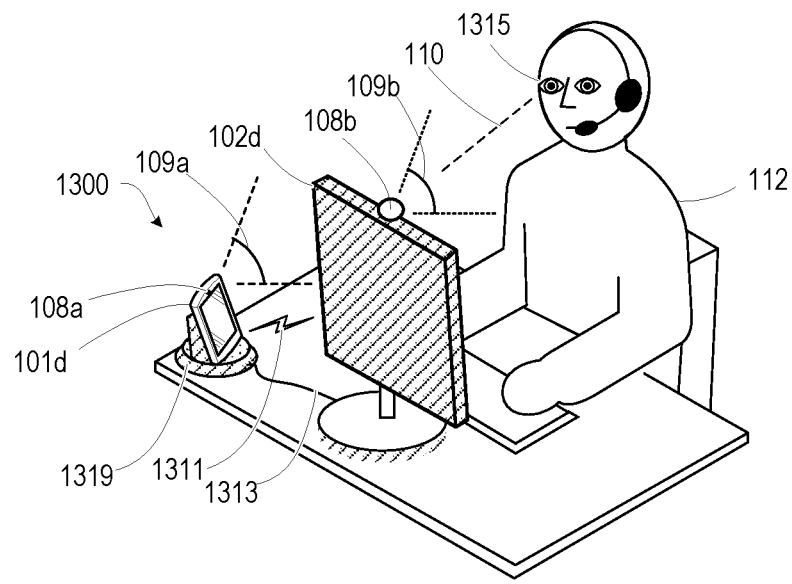
FIG. 13A is a three-dimensional view of a fourth example electronic system having an extendable display monitor in a retracted position that is communicatively coupled to and controlled by a communication device, according to one or more embodiments.
Figure 13B:
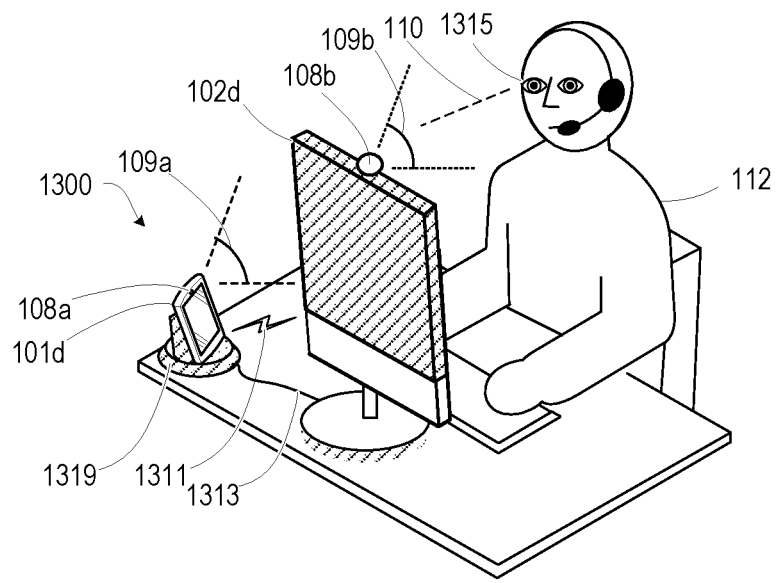
FIG. 13B is a three-dimensional view of the fourth example electronic system of FIG. 13A having the extendable display monitor in an extended position, according to one or more embodiments.

In one or more embodiments, communication device 101 and extendable display 102 are integrated to provide functionality of the present disclosure as the electronic system. Examples are described below in greater detail with regard to first example communication device 101a of FIGS. 10A-10F having scrolling extendable display 102a, second example communication device 101b of FIGS. 11A-11F having blade extendable display 102b, and third example communication device 101c of FIGS. 12A-12F having telescoping extendable display 102a. In one or more embodiments, communication device 101 and extendable display 102 may be communicatively coupled as separate devices of the electronic system. An example is described below in greater detail regarding fourth example communication device 101d communicatively coupled to external extendable display 102d that may extend by scrolling or rolling on an extending blade or telescoping housing (FIGS. 13A-13B).

With continued reference to FIG. 1, in addition to controller 120, communication device 101 may include communications subsystem 130, memory subsystem 132, data storage subsystem 134 and input/output (I/O) subsystem 136. To enable management by controller 120, system interlink 138 communicatively connects controller 120 with communications subsystem 130, memory subsystem 132, data storage subsystem 134 and I/O subsystem 136. System interlink 138 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 138) are illustrated in FIG. 1, it is to be understood that more, fewer, or different interconnections may be present in other embodiments.

Controller 120 includes processor subsystem 140, which includes one or more central processing units (CPUs) or data processors. Processor subsystem 140 can include one or more digital signal processors that can be integrated with data processor(s). Processor subsystem 140 can include other processors such as auxiliary processor(s) that may act as a low power consumption, always-on sensor hub for physical sensors. Controller 120 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Controller 120 may include various functionality that enables controller 120 to perform different aspects of artificial intelligence (AI) modules for computation tasks. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output.

Memory subsystem 132 stores program code 142 for execution by processor subsystem 140 to provide the functionality described herein. Program code 142 includes applications such as communication application 144 that generates incoming or outgoing calls. Program code 142 may include eye gaze directed scrolling application 145 and other applications 146. These applications may be software or firmware that, when executed by controller 120, configures communication device 101 to provide functionality described herein. In one or more embodiments, several of the described aspects of the present disclosure are provided via executable program code of applications executed by controller 120. In one or more embodiments, program code 142 may be integrated into a distinct chipset or hardware module as firmware that operates separately from executable program code. Portions of program code 142 may be incorporated into different hardware components that operate in a distributed or collaborative manner. Memory subsystem 132 further includes operating system (OS), firmware interface, such as basic input/output system (BIOS) or Uniform Extensible Firmware Interface (UEFI), and firmware, which also includes and may thus be considered as program code 142.

Program code 142 may access, use, generate, modify, store, or communicate computer data 150, such as visual content data 152 that may be used to present visual content 189. Computer data 150 may incorporate "data" that originated as raw, real-world "analog" information that consists of basic facts and figures. Computer data 150 includes different forms of data, such as numerical data, images, coding, notes, and financial data. Computer data 150 may originate at communication device 101 or be retrieved from a remote device via communications subsystem 130. Communication device 101 may store, modify, present, or transmit computer data 150 such as visual content data 152. Computer data 150 may be organized in one of a number of different data structures. Common examples of computer data 150 include video, graphics, text, and images. Computer data 150 can also be in other forms of flat files, databases, and other data structures.

Data storage subsystem 132 of communication device 101 includes data storage device(s) 158. Controller 120 is communicatively connected, via system interlink 138, to data storage device(s) 158. Data storage subsystem 134 provides program code 142 and computer data 150 stored on non-volatile storage that is accessible by controller 120. For example, data storage subsystem 134 can provide a selection of program code 142 and computer data 150. These applications can be loaded into memory subsystem 132 for execution/processing by controller 120. In one or more embodiments, data storage device(s) 158 can include hard disk drives (HDDs), optical disk drives, and/or solid-state drives (SSDs), etc. Data storage subsystem 134 of communication device 101 can include removable storage device(s) (RSD(s)) 160, which is received in RSD interface 162. Controller 120 is communicatively connected to RSD 160, via system interlink 138 and RSD interface 162. In one or more embodiments, RSD 160 is a non-transitory computer program product or computer readable storage device that may be executed by a processor associated with a user device such as communication device 101. Controller 120 can access data storage device(s) 158 or RSD 160 to provision communication device 101 with program code 142 and computer data 150.

I/O subsystem 136 may include input devices 164 such as image capturing device(s) 108, microphone 166, and touch input devices 170 (e.g., screens, keys or buttons). I/O subsystem 136 may include output devices 172 such as flexible display 106, audio output devices 174, lights 176, and vibratory or haptic output devices 178.

In one or more embodiments, controller 120, via communications subsystem 130, performs multiple types of cellular over-the-air (OTA) or wireless communication, such as by using a Bluetooth connection or other personal access network (PAN) connection. In an example, a user may wear a health monitoring device such as a smartwatch that is communicatively coupled via a wireless connection. In one or more embodiments, communications subsystem 130 includes a global positioning system (GPS) module that receives GPS broadcasts from GPS satellites to obtain geospatial location information. In one or more embodiments, controller 120, via communications subsystem 130, communicates via a wireless local area network (WLAN) link using one or more IEEE 802.11 WLAN protocols with an access point. In one or more embodiments, controller 120, via communications subsystem 130, may communicate via an OTA cellular connection with radio access networks (RANs). In an example, communication device 101, via communications subsystem 130, connects via RANs of a terrestrial network that is communicatively connected to a network server.

Controller 120 may be directly communicatively coupled, or indirectly communicatively coupled via system interlink 138 or a support processor, to one or more physical sensors. In an example, physical sensors may include orientation sensor 180 configured to detect in which direction is up. Physical sensors may include extension position sensor 181 configured to detect a position of flexible display support structure 104 between a retracted position, as depicted to the right of bracket 185a, and an extended position, as depicted to the right of bracket 185b. Controller 120 presents first portion 188 of visual content 189 on flexible display 106 while flexible display support structure 104 is in an at least partially retracted position. In response to visual content 189 having un-displayed second portion 190 that is contiguous with first portion 188 and determining that eye gaze direction 110a-110b has at least partially traversed first portion 188 of visual content towards one of translatable edge 191 of flexible display support structure 104 or opposite edge 192 of first housing 103 in a direction of un-displayed second portion 190, controller 120 triggers translation mechanism 105 to extend flexible display support structure 104 to translate an additional portion of flexible display 106 to the front of the device. Translation mechanism 105 can position flexible display support structure 104 at any one of multiple positions between a fully retracted position, at least one intermediate position, and a fully extended position. The actual number of intermediate positions is a design feature and can be different for each device and can also be programmable, e.g., by a device user. Controller 120 presents first portion 188 and second portion 190 of visual content 189 on extended flexible display 106 that includes the additional portion. In one or more embodiments, opposite edge 192 is a second translatable edge. Flexible display 106 may scroll or roll between both translatable edge 191 and opposite edge 192.

FIG. 2A is a front view of extendable display 102 of FIG. 1 in a retracted position and oriented to position translatable edge 191 at the top to expand upwardly. First housing 103 is below flexible display support structure 104, with opposite edge 192 being downward. Eye gaze direction 210a, at time T1, traverses upward over first portion 188 of visual content 189 of a map to eye gaze direction 210b, at time T2, proximate to translatable edge 191. FIG. 2B is a front view of extendable display 102 of FIG. 2A with flexible display support structure 104 translated upwardly to an extended position to enable continued upward movement of eye gaze direction 210c, at time T3, toward a correspondingly added upper second portion 190 of visual content 189 of the map. First portion 188 of visual content 189 remains stationary.

FIG. 3A is a front view of extendable display 102 of FIG. 1 in a retracted position and oriented to position translatable edge 191 at the top to expand upwardly. First housing 103 is below flexible display support structure 104, with opposite edge 192 being downward. Eye gaze direction 210a, at time T1, traverses downward over first portion 188 of visual content 189 of a map to eye gaze direction 210b, at time T2, proximate to opposite edge 192. FIG. 3B is a front view of extendable display 102 of FIG. 3A with flexible display support structure 104 translating upwardly to an extended position. First portion 188 of visual content 189 shifts upwardly with translating edge 191 while a correspondingly added lower second portion 190 of visual content 189 of the map is added below first portion 188 to enable continued downward eye gaze direction 210c, at time T3, toward second portion 190.

FIG. 4A is a front view of extendable display 102 of FIG. 1 in a retracted position and oriented to position translatable edge 191 at the bottom to expand downwardly. First housing 103 is above flexible display support structure 104, with opposite edge 192 being upward. Eye gaze direction 210a, at time T1, traverses upward over first portion 188 of visual content 189 of a map to eye gaze direction 210b, at time T2, proximate to opposite edge 192. FIG. 4B is a front view of extendable display 102 of FIG. 2A with flexible display support structure 104 translated downwardly to an extended position. First portion 188 of visual content 189 shifts downwardly with translating edge 191 while a correspondingly added upper second portion 190 of visual content 189 of the map is added above first portion 188 to enable continued upward eye gaze direction 210c, at time T3, toward second portion 190.

FIG. 5A is a front view of extendable display 102 of FIG. 1 in a retracted position and oriented to position translatable edge 191 at the bottom to expand downwardly. First housing 103 is above flexible display support structure 104, with opposite edge 192 being upward. Eye gaze direction 210a, at time T1, traverses downward over first portion 188 of visual content 189 of a map to eye gaze direction 210b, at time T2, proximate to translating edge 191. FIG. 5B is a front view of extendable display 102 of FIG. 5A with flexible display support structure 104 translated downwardly to an extended position. First portion 188 of visual content 189 remains stationary while adding lower second portion 190 of visual content below first portion 188 to enable continued downward eye gaze direction 210c, at time T3, toward second portion 190.

Figure 6A:
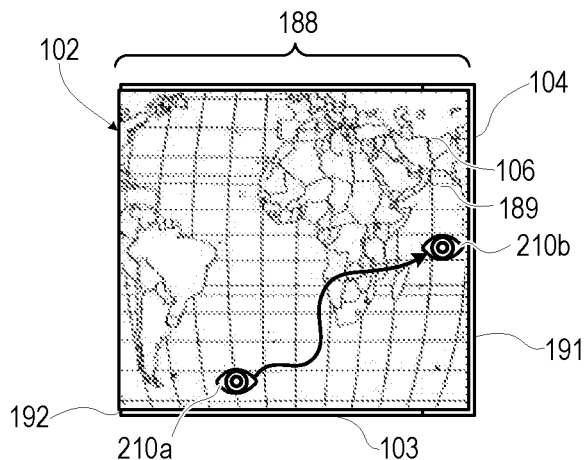
FIG. 6A is a front view of the extendable display of FIG. 1 in a retracted position and oriented to expand to the right and annotated with an eye gaze that traverses to the right over visual content of the map, according to one or more embodiments.
Figure 6B:
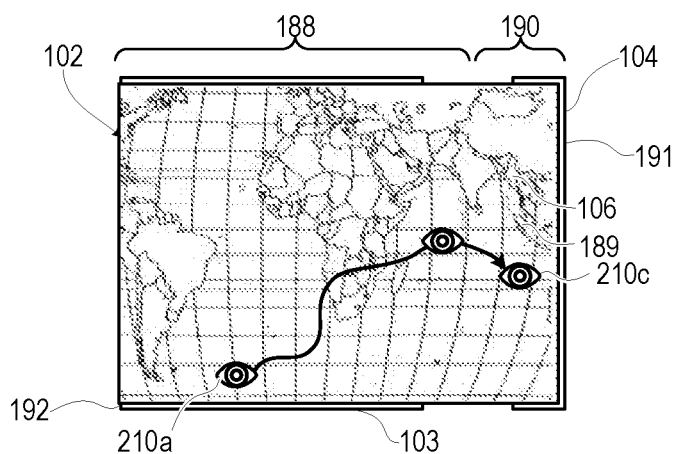
FIG. 6B is a front view of the extendable display of FIG. 6A in a right extended position to enable continued rightward gaze toward a correspondingly added right portion of the map, according to one or more embodiments.

FIG. 6A is a front view of extendable display 102 of FIG. 1 in a retracted position and oriented to position translatable edge 191 at the right to expand to the right. First housing 103 is to the left of flexible display support structure 104, with opposite edge 192 being leftward. Eye gaze direction 210a, at time T1, traverses rightward over first portion 188 of visual content 189 of a map to eye gaze direction 210b, at time T2, proximate to translating edge 191. FIG. 6B is a front view of extendable display 102 of FIG. 6A with flexible display support structure 104 translated rightward to an extended position. First portion 188 of visual content 189 remains stationary while adding right second portion 190 of visual content to the right of first portion 188 to enable continued rightward eye gaze direction 210c, at time T3, toward second portion 190.

Figure 7A:
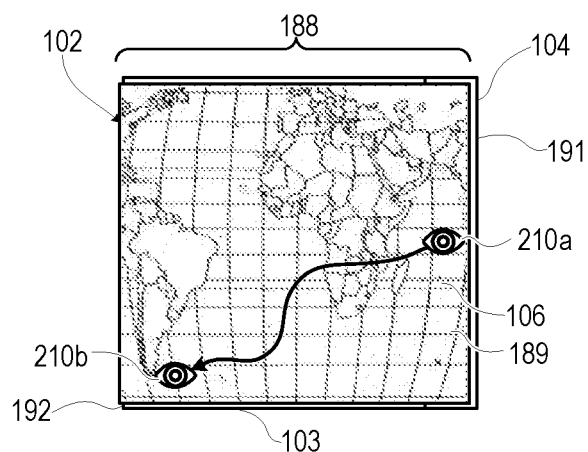
FIG. 7A is a front view of the extendable display of FIG. 1 in a retracted position and oriented to expand to the right and annotated with an eye gaze that traverses to the left over visual content of the map, according to one or more embodiments.
Figure 7B:
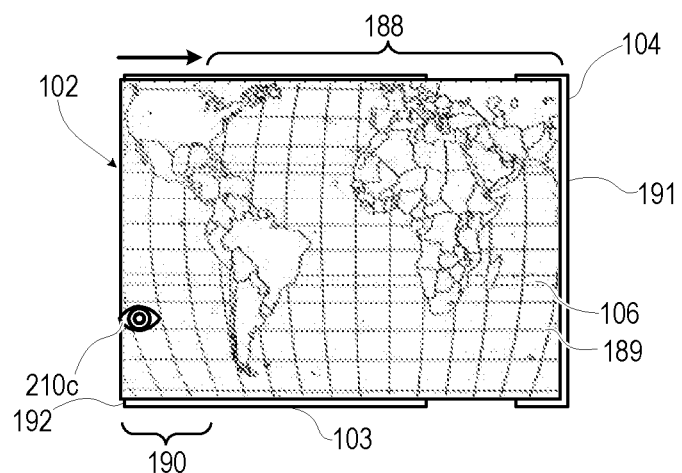
FIG. 7B is a front view of the extendable display of FIG. 7A in the right extended position to enable continued leftward gaze toward a correspondingly added left portion of the map, according to one or more embodiments.

FIG. 7A is a front view of extendable display 102 of FIG. 1 in a retracted position and oriented to position translatable edge 191 at the right to expand to the right. First housing 103 is to the left of flexible display support structure 104, with opposite edge 192 being leftward. Eye gaze direction 210a, at time T1, traverses leftward over first portion 188 of visual content 189 of a map to eye gaze direction 210b, at time T2, proximate to opposite edge 192. FIG. 7B is a front view of extendable display 102 of FIG. 7A with flexible display support structure 104 translated rightward to an extended position. First portion 188 of visual content 189 shifts rightward with translating edge 191 while a correspondingly added left second portion 190 of visual content 189 of the map is added to the left of first portion 188 to enable continued leftward eye gaze direction 210c, at time T3, toward second portion 190.

Figure 8A:
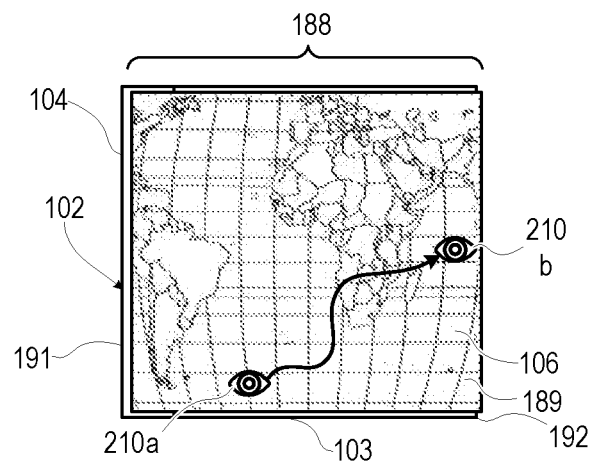
FIG. 8A is a front view of the extendable display of FIG. 1 in a retracted position and oriented to expand to the left and annotated with an eye gaze that traverses rightward over visual content of the map, according to one or more embodiments.
Figure 8B:
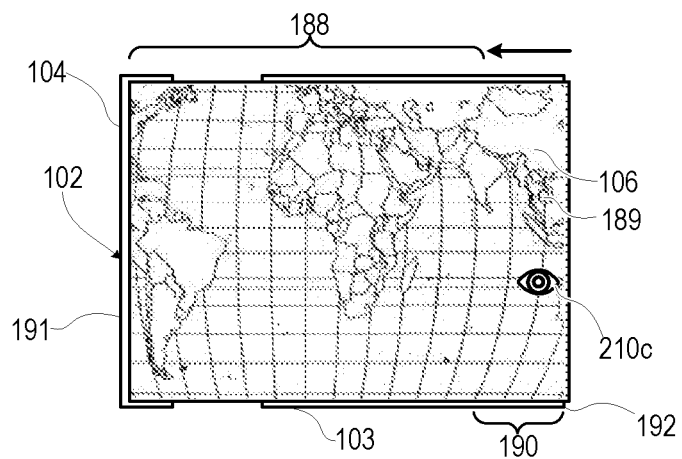
FIG. 8B is a front view of the extendable display of FIG. 8A in a left extended position to enable continued leftward gaze toward a correspondingly added left portion of the map with the map shifting to the right, according to one or more embodiments.

FIG. 8A is a front view of extendable display 102 of FIG. 1 in a retracted position and oriented to position translatable edge 191 at the left to expand to the left. First housing 103 is to the right of flexible display support structure 104, with opposite edge 192 being rightward. Eye gaze direction 210a, at time T1, traverses rightward over first portion 188 of visual content 189 of a map to eye gaze direction 210b, at time T2, proximate to opposite edge 192. FIG. 8B is a front view of extendable display 102 of FIG. 8A with flexible display support structure 104 translated leftward to an extended position. First portion 188 of visual content 189 shifts leftward with translating edge 191 while a correspondingly added right second portion 190 of visual content 189 of the map is added to the left of first portion 188 to enable continued rightward eye gaze direction 210c, at time T3, toward second portion 190.

Figure 9A:
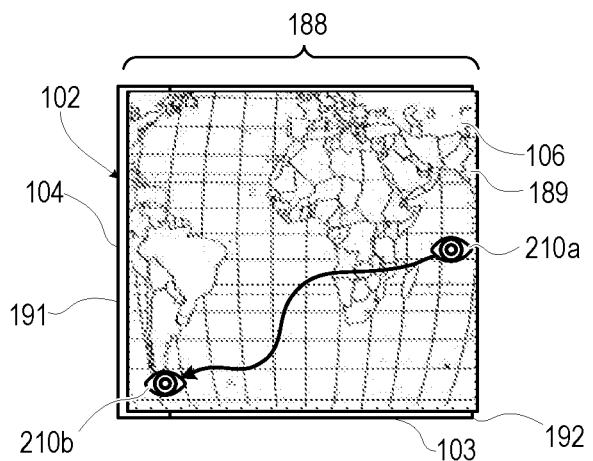
FIG. 9A is a front view of the extendable display of FIG. 1 in a retracted position and oriented to expand to the left and annotated with an eye gaze that traverses rightward over visual content of a map, according to one or more embodiments.
Figure 9B:
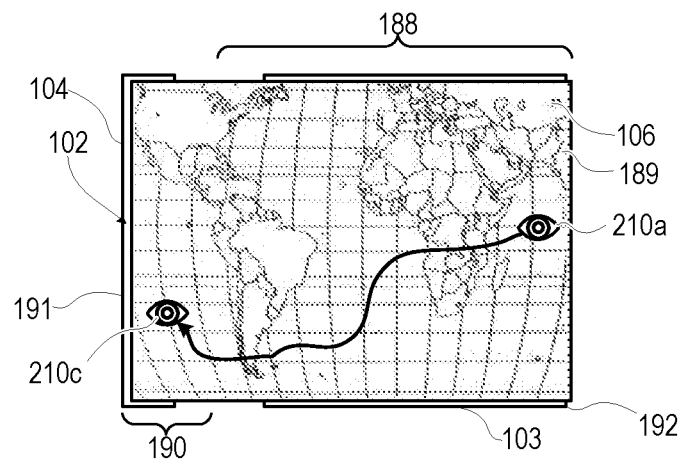
FIG. 9B is a front view of the extendable display of FIG. 9A in the left extended position to enable continued rightward gaze toward a correspondingly added right portion of the map, according to one or more embodiments.

FIG. 9A is a front view of extendable display 102 of FIG. 1 in a retracted position and oriented to position translatable edge 191 at the left to expand to the left. First housing 103 is to the right of flexible display support structure 104, with opposite edge 192 being rightward. Eye gaze direction 210a, at time T1, traverses leftward over first portion 188 of visual content 189 of a map to eye gaze direction 210b, at time T2, proximate to translating edge 191. FIG. 9B is a front view of extendable display 102 of FIG. 9A with flexible display support structure 104 translated rightward to an extended position. First portion 188 of visual content 189 remains stationary while adding left second portion 190 of visual content to the left of first portion 188 to enable continued leftward eye gaze direction 210c, at time T3, toward second portion 190.

FIG. 10A is a front view of first example communication device 101a having scrolling extendable display 102a including first housing 1003 coupled to flexible display support structure 104 (FIG. 1) that is implemented as telescoping housing 1004, which is in a retracted position. Flexible display 1006 extends across front side 1012 of first housing 1003 and telescoping housing 1004. FIG. 10B is a left side view of second example communication device 101a having telescoping housing 1004 in the retracted position relative to first housing 1003. A remaining portion of flexible display 1006 scrolls up on scrolling mechanism 1008 when telescoping housing 1004 is in the retracted position. FIG. 10C is a back view of second example communication device 101a having telescoping housing 1004 in the retracted position. FIG. 10D is a front view of second example communication device 101a with telescoping housing 1004 in an extended position that increases a front portion of flexible display 1006 on front side 1012 as compared to the retracted position of FIG. 10A. FIG. 10E is a left side view of second example communication device 101a having telescoping housing 1004 in the extended position, which unscrolls an additional portion of flexible display 1006 from scrolling mechanism 1008 to cover extension portion 1009 of telescoping housing 1004. FIG. 10F is a back view of second example communication device 101a having the telescoping housing in the extended position. Translation mechanism 105 (FIG. 1) may be implemented as an electric motor that operates by extending and retracting telescoping housing 1004 relative to first housing 1003. Scrolling mechanism may be spring loaded to reel in a remaining portion of flexible display 1006 during retraction and to release the remaining portion of flexible display 1006 during extension.

Figure 11A:
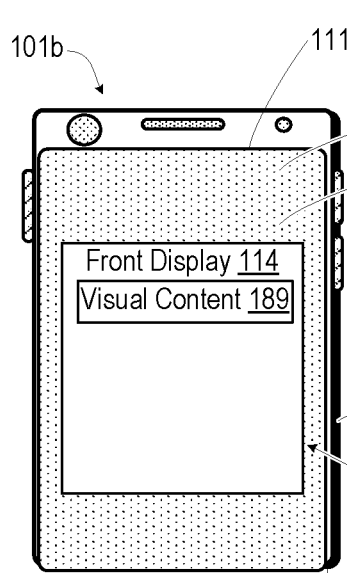
FIG. 11A is a front view of a first example communication device having a flexible display support structure implemented as a blade assembly that is in a retracted position, according to one or more embodiments.
Figure 11B:
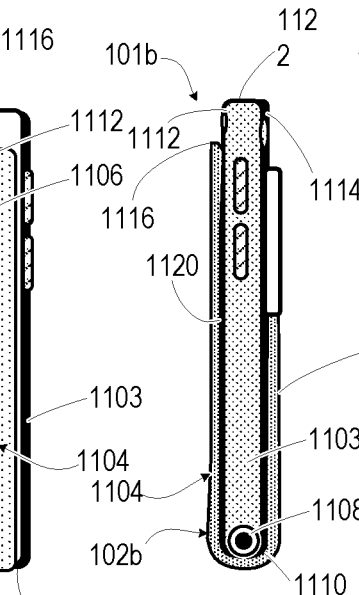
FIG. 11B is a left side view of the first example communication device of FIG. 11A having the blade assembly in the retracted position, according to one or more embodiments.
Figure 11C:
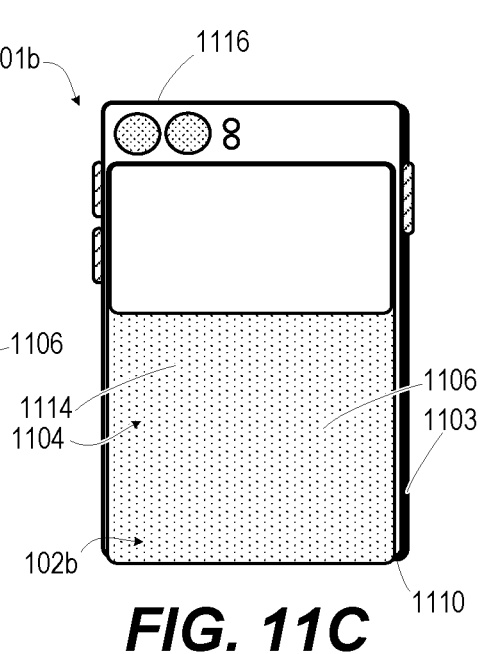
FIG. 11C is a back view of the first example communication device of FIG. 11A having the blade assembly in the retracted position, according to one or more embodiments.

FIG. 11A is a front view of second example communication device 101b having blade extendable display 102b that includes first housing 1103. Flexible display support structure 104 (FIG. 1) is implemented as blade assembly 1104 that positions flexible display 1106 in a retracted position relative to first housing 1103. FIG. 11B is a left side view of first example communication device 101b having blade assembly 1104 in the retracted position. Display roller 1108 is positioned at and aligned with first housing edge 1110, which is at the bottom, as depicted, of first housing 1103 between front side 1112 and back side 1114 and opposite to distal edge 1116 of blade assembly 1104. FIG. 11C is a back view of first example communication device 101b having blade assembly 1104 in the retracted position. With particular reference to FIGS. 11B-11C, a larger portion of flexible display 1106 is rolled onto back side 1114 of communication device 101b.

Figure 11D:
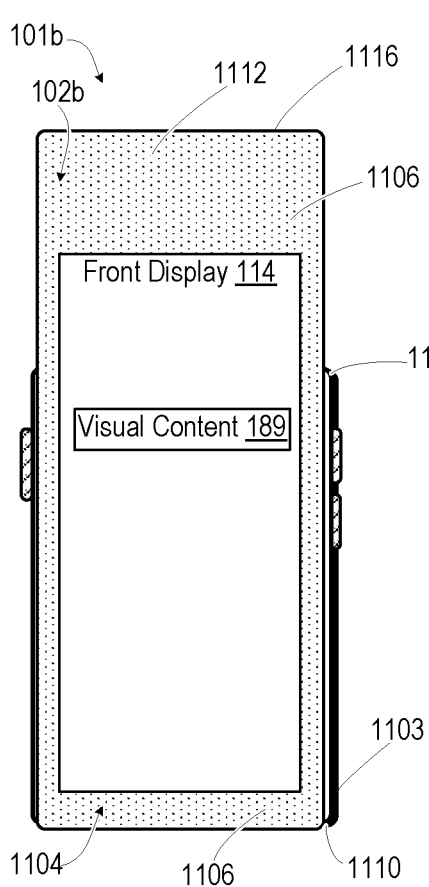
FIG. 11D is a front view of the first example communication device of FIG. 11A with the blade assembly in an extended position, according to one or more embodiments.
Figure 11E:
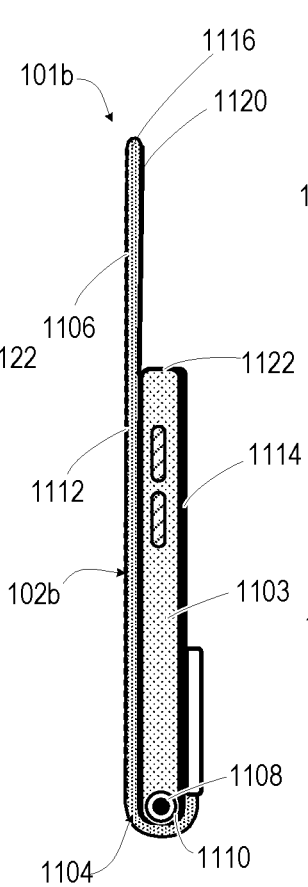
FIG. 11E is a left side view of the first example communication device of FIG. 11A having the blade assembly in the extended position, according to one or more embodiments.
Figure 11F:
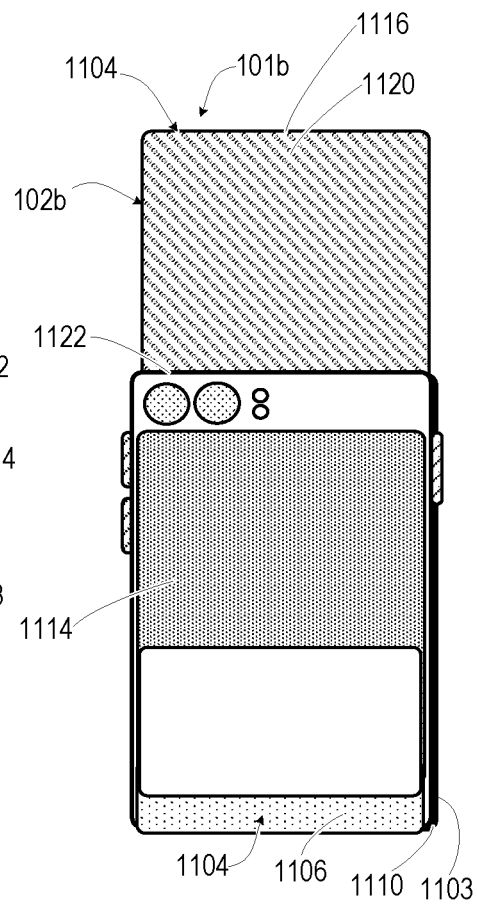
FIG. 11F is a back view of the first example communication device of FIG. 11A having the blade assembly in the extended position, according to one or more embodiments.

FIG. 11D is a front view of first example communication device 101b with blade assembly 1104 in an extended position that increases a front portion of flexible display 1106 on front side 1112 as compared to the retracted position of FIG. 11A. FIG. 11E is a left side view of first example communication device 101b having blade assembly 1104 in the extended position. FIG. 11F is a back view of first example communication device 101b having blade assembly 1104 in the extended position. With particular reference to FIGS. 11E-11F, blade assembly 1104 includes blade substrate 1120 that is slidably coupled to first housing 1103. Flexible display 1106 is attached to blade substrate 1120. As described below with regard to FIG. 4, blade substrate 1120 has a rigid portion positionable between a retracted position aligned with front side 1112 of first housing 1103 (FIGS. 11A-11C) and an extended position extending beyond second housing edge 1122 opposite to first housing edge 1110. Blade substrate 1120 includes a flexible portion that contacts display roller 1108 between the retracted position and the extended position to move a portion of blade assembly 1104 between front side 1112 and back side 1114. Translation mechanism 105 (FIG. 1) may be implemented as an electric motor that operates by rotating display roller 1108 (FIGS. 11B and 11E) that is engaged to blade substrate 1120 to slide blade assembly 1104 relative to first housing 1103 between a fully retracted position and a fully extended position. Alternatively, translation mechanism 105 (FIG. 1) may be implemented as an electric motor that operates by sliding blade assembly 1104 that is guided by display roller 1108, which is passively positioned.

FIG. 12A is a front view of third example communication device 101c having telescoping extendable display 102a. First housing 1203 is coupled to flexible display support structure 104 (FIG. 1) that is implemented as telescoping housing 1204, which is in a retracted position. Flexible display 1206 extends across front side 1212 of first housing 1203 and telescoping housing 1204. FIG. 12B is a left side view of third example communication device 101c having telescoping housing 1204 in the retracted position. Display roller 1208 is positioned at and aligned with first housing edge 1210, which is at the bottom, as depicted, of first housing 1203 between front side 1212 and back side 1214 and opposite to distal edge 1216 of telescoping housing 1204. Flexible display 1206 contacts display roller 1208 between the retracted position and the extended position to move a portion of flexible display 1206 between front side 1212 and back side 1214. FIG. 12C is a back view of third example communication device 101c having telescoping housing 1204 in the retracted position. FIG. 12D is a front view of third example communication device 101c with telescoping housing 1204 in an extended position that increases a front portion of flexible display 1206 on front side 1212 as compared to the retracted position of FIG. 12A. FIG. 12E is a left side view of third example communication device 101c having telescoping housing 1204 in the extended position. FIG. 12F is a back view of third example communication device 101c having the telescoping housing in the extended position. Translation mechanism 105 (FIG. 1) may be implemented as an electric motor that operates by rotating display roller 1208 (FIGS. 12B and 12E), which is engaged to flexible display 1206 to translate flexible display 1206 relative to first housing 1203, between a fully retracted position and a fully extended position. Alternatively, translation mechanism 105 (FIG. 1) may be implemented as an electric motor that operates by moving flexible display 1206 that is guided by display roller 1208, which is passively positioned.

FIG. 13A is a three-dimensional view of fourth example electronic system 1300 having external extendable display 102d in a retracted position that is communicatively coupled to and controlled by communication device 101d via a wireless link 1311 or wired link 1313. Communication device 101d may be similar or identical to communication device 101 (FIG. 1). External extendable display 102d may be implementations similar or identical to scrolling extendable display 102a (FIG. 10A), blade extendable display 102b (FIG. 11A), or telescoping extendable display 102c (FIG. 12A).

FIG. 13B is a three-dimensional view of fourth example electronic system 1300 of FIG. 13A having external extendable display 102d in an extended position. With reference to FIGS. 13A-13B, user 112 is positioned in front of external extendable display 102d with eyes 1315 gazing toward front display 114 of flexible display 106 (FIG. 1). Communication device 101d monitors eye gaze direction 110 using one of integral image capturing device 108a of communication device 101d or external image capturing device 108b of external extendable display 102d. Respective field of views 109a-109b of integral image capturing device 108a and external image capturing device 108b capture at least eyes 1315 of user 112. In an example, external extendable display 102d extends upward and retracts downward at top translating edge 191. Controller 120 (FIG. 1) of communication device 101d determines that the visual content being presented by external extendable display 102d includes an un-displayed upper portion. When eye gaze direction moves toward or is proximate to top translating edge 191, controller 120 (FIG. 1) identifies a trigger for extending external extendable display 102d as retracted in FIG. 13A to the extended position of FIG. 13B.

Communication device 101d may be implemented as a handheld mobile device that is placed in dock 1319. Dock 1319 may provide physical positioning of communication device 101d to orient front image capturing device 108a toward user 112 for monitoring eyes 1315. Dock 1319 may provide electrical power to communication device 101d. Dock 1319 may provide wired link 1313 to external extendable display 102d that presents visual content to user 112.

Figure 14:
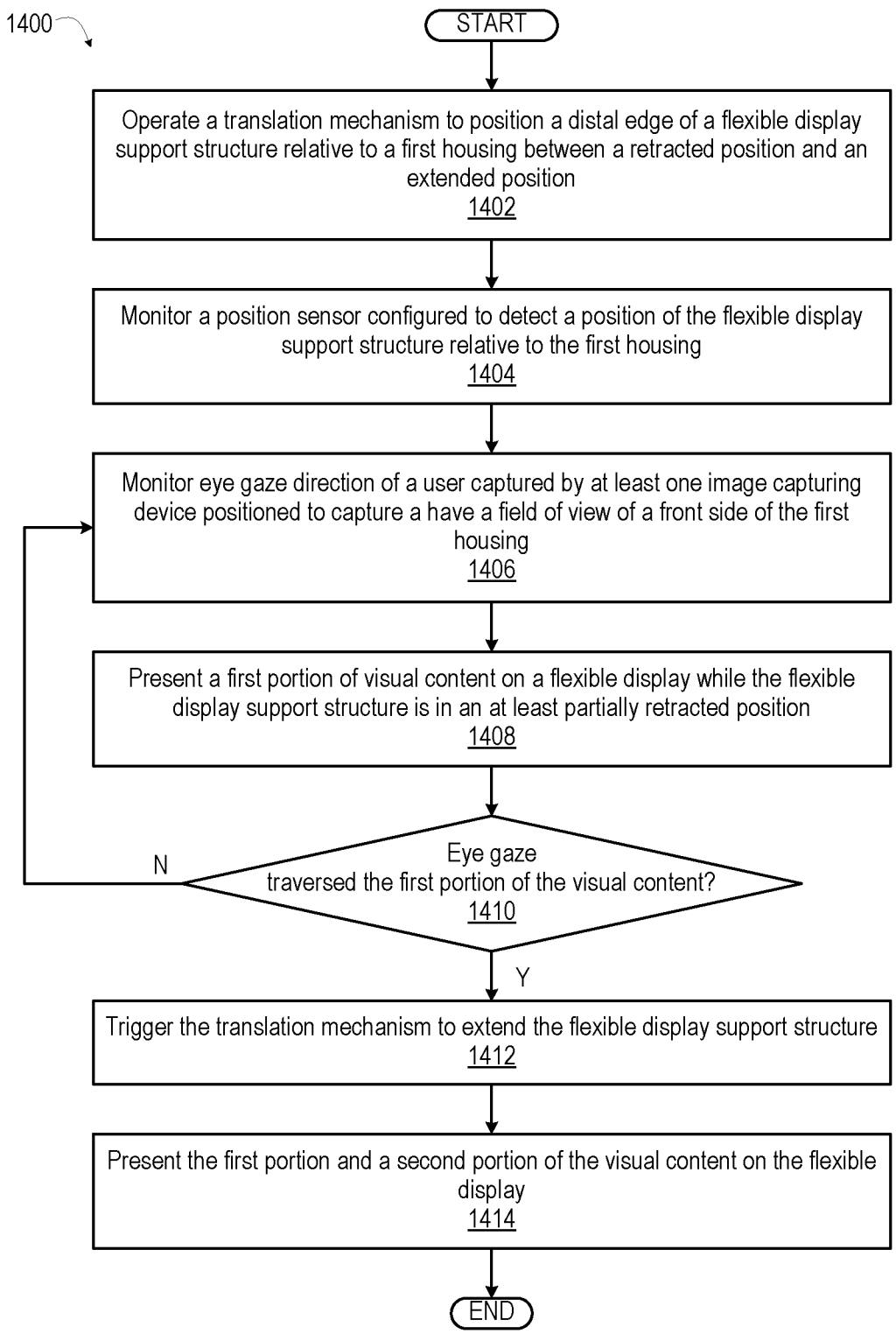
FIG. 14 is a flow diagram presenting a method of automatically extending a display to present more visual content responsive to a gaze direction of a user that is interpreted as a scrolling or panning gesture toward previously un-displayed visual content, according to one or more embodiments.

FIG. 14 is a flow diagram presenting method 1400 of automatically extending a display to present more visual content responsive to a gaze direction of a user towards an edge of the display, where a change in the eye gaze direction towards the edge of the display is interpreted as a scrolling or panning gesture toward previously un-displayed visual content. The description of method 1400 (FIG. 14) are provided with general reference to the specific components illustrated within the preceding FIGS. 1, 2A-2B, 3A-3B, 4A-4B, 5A-5B, 6A-6B, 7A-7B, 8A-8B, 9A-9B, 10A-10F, 11A-11F, 12A-12F, and 13A-13B, specific components referenced in method 1400 (FIG. 14) may be identical or similar to components of the same name used in describing preceding FIGS. 1, 2A-2B, 3A-3B, 4A-4B, 5A-5B, 6A-6B, 7A-7B, 8A-8B, 9A-9B, 10A-10F, 11A-11F, 12A-12F, and 13A-13B. In one or more embodiments, controller 120 (FIG. 1) configures communication device 101 (FIG. 1), communication device 101a (FIG. 10A), communication device 101b (FIG. 11A), communication device 101c (FIG. 12A), communication device 101d (FIG. 13A) or a similar computing device to provide the described functionality of method 1400 (FIG. 14).

With reference to FIG. 14, method 1400 includes operating a translation mechanism to position a distal edge of a flexible display support structure relative to a first housing between a retracted position and an extended position (block 1402). Method 1400 includes monitoring a position sensor configured to detect a position of the flexible display support structure relative to the first housing (block 1404). Method 1400 includes monitoring eye gaze direction of a user captured by at least one image capturing device positioned to have a field of view of a front side of the first housing (block 1406). Method 1400 includes presenting a first portion of visual content on a flexible display while the flexible display support structure is in an at least partially retracted position (block 1408). Method 1400 includes determining whether the eye gaze direction traverses the first portion of the visual content towards one of a translatable edge of the flexible display support structure or an opposite edge of the first housing in a direction of un-displayed content (decision block 1410). In one or more embodiments, at least partially traversing the first portion may include eye gaze moving from any point on or off of the visual content toward one of the translating edge of the flexible display support structure or the opposite edge of the first housing. In response to determining that the eye gaze direction has not at least partially traversed the first portion of the visual content, method 1400 returns to block 1406. In response to determining that the eye gaze direction has at least partially traversed the first portion of the visual content, method 1400 includes triggering the translation mechanism to extend the flexible display support structure (block 1412). Method 1400 includes presenting the first portion and a second portion of the visual content on the flexible display (block 1414). Then method 1400 ends.

In one or more embodiments, in response to determining that the flexible display support structure is oriented to move vertically relative to the first housing, method 1400 may further include determining that the gaze has at least partially traversed the first portion of the visual content based on identifying a beginning eye gaze direction toward one of an upper portion or a lower portion of the flexible display and an ending eye gaze direction toward the other one of the upper portion or the lower portion lower portion of the flexible display. Subsequent to triggering the translation mechanism to extend the flexible display support structure, method 1400 may further include maintaining presentation of the first portion of the visual content at the one of the upper portion or the lower portion of the beginning eye gaze direction. Method 1400 may further include presenting the second portion of the visual content on the other one of the upper portion or the lower portion of the flexible display corresponding to the ending eye gaze direction.

In one or more embodiments, in response to determining that the flexible display support structure is oriented to move horizontally relative to the first housing, method 1400 may further include determining that the gaze has at least partially traversed the first portion of the visual content based on identifying a beginning eye gaze direction toward a first lateral side of the flexible display and an ending eye gaze direction toward a second lateral side of the flexible display. Subsequent to triggering the translation mechanism to extend the flexible display support structure, method 1400 may further include maintaining presentation of the first portion of the visual content toward the first lateral side of the flexible display, resulting in the first portion of the visual content to move sideways. Method 1400 may further include presenting the second portion of the visual content on adjacent lateral portion of the flexible display.

In one or more embodiments, the first electronic device includes the first housing. The flexible display support structure, the flexible display, the position sensor, and the translation mechanism. A second electronic device includes a controller that is communicatively coupled to a communications subsystem. Method 1400 may further include communicatively configuring the communications subsystem to communicatively couple the second electronic device to the first electronic device, to receive position data from the position sensor, to transmit visual content to the flexible display, and to transmit an activation trigger to the translation mechanism.

In one or more particular embodiments, the first electronic device includes a memory that stores a universal device controller client. The second electronic device includes a memory communicatively coupled to the controller and that stores a universal device controller application. Method 1400 may further include executing the universal device controller application to configure the communications subsystem to support a communication exchange with the first electronic device, which executes the universal device controller client. Method 1400 may further include triggering, via the communication exchange, the first electronic device to present the visual content and to activate the translation mechanism.

In one or more embodiments, a scrolling mechanism is incorporated in the first housing and that receives the remaining portion of the flexible display while the flexible display support structure is in the retracted position. The flexible display support structure is a telescoping housing having an extension portion slidingly received into a first housing edge of the first housing. Method 1400 may further include activating the translation mechanism to position the telescoping housing relative to the first housing between a fully retracted position and a fully extended position.

In one or more embodiments, a display roller rolls the remaining portion of the flexible display to provide a back display on the back side of the first housing, while the flexible display support structure is in the retracted position. The flexible display support structure is a blade assembly having a blade slidably coupled to the first housing and having the flexible display attached to the blade, the blade having a rigid portion positionable between a retracted position aligned with the front side of the device housing and an extended position extending beyond a second housing edge opposite to the first housing edge of the first housing. The blade includes a flexible portion that contacts the display roller to move a portion of the blade assembly between the front side and the back side. Method 1400 may further include activating the translation mechanism to slide the blade assembly relative to the first housing between a fully retracted position and a fully extended position.

In one or more embodiments, a display roller that rolls the remaining portion of the flexible display to provide a back display on the back side of the first housing, while the flexible display support structure is in the retracted position. The flexible display support structure is a telescoping housing having an extension portion slidingly received into a first housing edge of the first housing. Method 1400 may further include activating the translation mechanism to position the telescoping housing relative to the first housing between a fully retracted position and a fully extended position.

In one or more embodiments, method 1400 may further include executing an application that generates the visual content. Method 1400 may further include determining whether eye gaze extension mode is enabled for the application. Method 1400 may further include triggering the translation mechanism to extend the flexible display support structure and presents the first portion and a second portion of the visual content on an extended flexible display further in response to determining that the eye gaze extension mode is enabled.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic system comprising:
   a first housing having a front side and a back side;
   a flexible display support structure moveably attached to and positionable on the first housing to move a distal edge between a retracted position and an extended position relative to the first housing;
   at least one image capturing device positioned to have a field of view of the front side of the first housing;
   a flexible display coupled to the flexible display support structure across a front side of the first housing to present a larger portion of the flexible display as a front display on the front side, while the flexible display support structure is in the extended position, and a smaller portion of the flexible display as the front display on the front side, while the flexible display support structure is in the retracted position, with a remaining portion of the flexible display being one of: (i) scrolled up inside of the first housing; and (ii) rolled back providing a back display on the back side of the first housing;
   a translation mechanism operable to position the flexible display support structure between the retracted position and the extended position;
   a position sensor configured to detect a position of the flexible display support structure relative to the first housing; and
   a controller communicatively coupled to the flexible display, the at least one image capturing device, the translation mechanism, and the position sensor, and which:
      monitors eye gaze direction of a user positioned in the field of view of the at least one image capturing device;
      presents a first portion of visual content on the flexible display while the flexible display support structure is in an at least partially retracted position; and
      in response to the visual content having an un-displayed second portion that is contiguous with the first portion and determining that the eye gaze direction has at least partially traversed the first portion of the visual content towards one of a translatable edge of the flexible display support structure or an opposite edge of the first housing in a direction of the un-displayed second portion:
         triggers the translation mechanism to extend the flexible display support structure to translate an additional portion of the flexible display to the front portion; and
         presents the first portion and a second portion of the visual content on an extended flexible display comprising the additional portion.

2. The electronic system of claim 1, wherein the controller:
   in response to determining that the flexible display support structure is oriented to move vertically relative to the first housing:
      determines that the gaze has at least partially traversed the first portion of the visual content based on identifying a beginning eye gaze direction toward one of an upper portion or a lower portion of the flexible display and an ending eye gaze direction toward the other one of the upper portion or the lower portion lower portion of the flexible display; and
   subsequent to triggering the translation mechanism to extend the flexible display support structure:
      maintains presentation of the first portion of the visual content at the one of the upper portion or the lower portion of the beginning eye gaze direction; and
      presents the second portion of the visual content on the other one of the upper portion or the lower portion of the flexible display corresponding to the ending eye gaze direction.

3. The electronic system of claim 1, wherein the controller:
   in response to determining that the flexible display support structure is oriented to move horizontally relative to the first housing:
      determines that the gaze has at least partially traversed the first portion of the visual content based on identifying a beginning eye gaze direction toward a first lateral side of the flexible display and an ending eye gaze direction toward a second lateral side of the flexible display; and
   subsequent to triggering the translation mechanism to extend the flexible display support structure:
      maintains presentation of the first portion of the visual content toward the first lateral side of the flexible display; resulting in the first portion of the visual content to move laterally sideways; and
      presents the second portion of the visual content on laterally adjacent portion of the flexible display.

4. The electronic system of claim 1, further comprising:
   a first electronic device comprising the first housing, the flexible display support structure, the flexible display, and the translation mechanism; and
   a second electronic device comprising the controller and a communications subsystem communicatively coupled to the controller, and wherein the controller configures the communications subsystem to connect the controller to the first electronic device.

5. The electronic system of claim 4, wherein:
   the first electronic device comprises a memory that stores a universal device controller client;
   the second electronic device comprises a memory communicatively coupled to the controller and that stores a universal device controller application; and
   the controller:
      executes the universal device controller application to configure the communications subsystem to support a communication exchange with the first electronic device, which executes the universal device controller client; and
      triggers, via the communication exchange, the first electronic device to present the visual content and to activate the translation mechanism.

6. The electronic system of claim 1, further comprising a scrolling mechanism incorporated in the first housing and that receives the remaining portion of the flexible display while the flexible display support structure is in the retracted position, and wherein:
   the flexible display support structure comprises a telescoping housing having an extension portion slidingly received into a first housing edge of the first housing; and the controller activates the translation mechanism to position the telescoping housing relative to the first housing between a fully retracted position and a fully extended position.

7. The electronic system of claim 1, further comprising a display roller that rolls the remaining portion of the flexible display to provide a back display on the back side of the first housing, while the flexible display support structure is in the retracted position, and wherein:
the flexible display support structure comprises a blade assembly having a blade slidably coupled to the first housing and having the flexible display attached to the blade, the blade having a rigid portion positionable between a retracted position aligned with the front side of the device housing and an extended position extending beyond a second housing edge opposite to the first housing edge of the first housing, the blade comprising a flexible portion that contacts the display roller to move a portion of the blade assembly between the front side and the back side; and
the controller activates the translation mechanism to slide the blade assembly relative to the first housing between a fully retracted position and a fully extended position.

8. The electronic system of claim 1, further comprising a display roller that rolls the remaining portion of the flexible display to provide a back display on the back side of the first housing, while the flexible display support structure is in the retracted position, and wherein:
the flexible display support structure comprises a telescoping housing having an extension portion slidingly received into a first housing edge of the first housing; and
the controller activates the translation mechanism to position the telescoping housing relative to the first housing between a fully retracted position and a fully extended position.

9. The electronic system of claim 1, wherein the controller:
executes an application that generates the visual content;
determines whether eye gaze extension mode is enabled for the application; and
triggers the translation mechanism to extend the flexible display support structure and presents the first portion and a second portion of the visual content on an extended flexible display further in response to determining that the eye gaze extension mode is enabled.

10. A method comprising:
operating a translation mechanism to position a distal edge of a flexible display support structure relative to a first housing between a retracted position and an extended position;
monitoring a position sensor configured to detect a position of the flexible display support structure relative to the first housing;
monitoring eye gaze direction of a user captured by at least one image capturing device positioned to capture a have a field of view of a front side of the first housing;
presenting a first portion of visual content on a flexible display while the flexible display support structure is in an at least partially retracted position, the flexible display coupled to the flexible display support structure across a front side of the first housing to present a larger portion of the flexible display as a front display on the front side, while the flexible display support structure is in the extended position, and a smaller portion of the flexible display as the front display on the front side, while the flexible display support structure is in the retracted position, with a remaining portion of the flexible display being one of: (i) scrolled up inside of the first housing; and (ii) rolled back providing a back display on the back side of the first housing; and
in response to determining that the eye gaze direction has at least partially traversed the first portion of the visual content towards one of a translatable edge of the flexible display support structure or an opposite edge of the first housing in a direction of an un-displayed second portion:
triggering the translation mechanism to extend the flexible display support structure; and
presenting the first portion and a second portion of the visual content on the flexible display.

11. The method of claim 10, further comprising:
in response to determining that the flexible display support structure is oriented to move vertically relative to the first housing:
determining that the gaze has at least partially traversed the first portion of the visual content based on identifying a beginning eye gaze direction toward one of an upper portion or a lower portion of the flexible display and an ending eye gaze direction toward the other one of the upper portion or the lower portion lower portion of the flexible display; and
subsequent to triggering the translation mechanism to extend the flexible display support structure:
maintaining presentation of the first portion of the visual content at the one of the upper portion or the lower portion of the beginning eye gaze direction; and
presenting the second portion of the visual content on the other one of the upper portion or the lower portion of the flexible display corresponding to the ending eye gaze direction.

12. The method of claim 10, further comprising:
in response to determining that the flexible display support structure is oriented to move horizontally relative to the first housing:
determining that the gaze has at least partially traversed the first portion of the visual content based on identifying a beginning eye gaze direction toward a first lateral side of the flexible display and an ending eye gaze direction toward a second lateral side of the flexible display; and
subsequent to triggering the translation mechanism to extend the flexible display support structure:
maintaining presentation of the first portion of the visual content toward the first lateral side of the flexible display; resulting in the first portion of the visual content to move sideways; and
presenting the second portion of the visual content on adjacent lateral portion of the flexible display.

13. The method of claim 10, wherein first electronic device comprises the first housing, the flexible display support structure, the flexible display, the position sensor, and the translation mechanism, and a second electronic device comprises a controller communicatively coupled to a communications subsystem, the method further comprises communicatively configuring the communications subsystem to communicatively couple the second electronic device to the first electronic device to receive position data from the position sensor and to transmit visual content to the flexible display and to transmit an activation trigger to the translation mechanism.

14. The method of claim 13, wherein the first electronic device comprises a memory that stores a universal device controller client, and the second electronic device comprises a memory communicatively coupled to the controller and that stores a universal device controller application, and wherein the method further comprises:
- executing the universal device controller application to configure the communications subsystem to support a communication exchange with the first electronic device, which executes the universal device controller client; and
- triggering, via the communication exchange, the first electronic device to present the visual content and to activate the translation mechanism.

15. The method of claim 10, wherein:
- a scrolling mechanism is incorporated in the first housing and that receives the remaining portion of the flexible display while the flexible display support structure is in the retracted position;
- the flexible display support structure comprises a telescoping housing having an extension portion slidingly received into a first housing edge of the first housing; and
- the method further comprises activating the translation mechanism to position the telescoping housing relative to the first housing between a fully retracted position and a fully extended position.

16. The method of claim 10, wherein:
- a display roller rolls the remaining portion of the flexible display to provide a back display on the back side of the first housing, while the flexible display support structure is in the retracted position;
- the flexible display support structure comprises a blade assembly having a blade slidably coupled to the first housing and having the flexible display attached to the blade, the blade having a rigid portion positionable between a retracted position aligned with the front side of the device housing and an extended position extending beyond a second housing edge opposite to the first housing edge of the first housing, the blade comprising a flexible portion that contacts the display roller to move a portion of the blade assembly between the front side and the back side; and
- the method further comprises activating the translation mechanism to slide the blade assembly relative to the first housing between a fully retracted position and a fully extended position.

17. The method of claim 10, wherein:
- a display roller that rolls the remaining portion of the flexible display to provide a back display on the back side of the first housing, while the flexible display support structure is in the retracted position;
- the flexible display support structure comprises a telescoping housing having an extension portion slidingly received into a first housing edge of the first housing; and
- the method further comprises activating the translation mechanism to position the telescoping housing relative to the first housing between a fully retracted position and a fully extended position.

18. The method of claim 10, further comprising:
- executing an application that generates the visual content;
- determining whether eye gaze extension mode is enabled for the application; and
- triggering the translation mechanism to extend the flexible display support structure and presents the first portion and a second portion of the visual content on an extended flexible display further in response to determining that the eye gaze extension mode is enabled.

19. A computer program product comprising:
- a computer readable storage device; and
- program code on the computer readable storage device that when executed by a processor associated with an electronic device, the program code enables the electronic device to provide functionality of:
  - operating a translation mechanism to position a distal edge of a flexible display support structure relative to a first housing between a retracted position and an extended position;
  - monitoring a position sensor configured to detect a position of the flexible display support structure relative to the first housing;
  - monitoring eye gaze direction of a user captured by at least one image capturing device positioned to capture a have a field of view of a front side of the first housing;
  - presenting a first portion of visual content on a flexible display while the flexible display support structure is in an at least partially retracted position, the flexible display coupled to the flexible display support structure across a front side of the first housing to present a larger portion of the flexible display as a front display on the front side, while the flexible display support structure is in the extended position, and a smaller portion of the flexible display as the front display on the front side, while the flexible display support structure is in the retracted position, with a remaining portion of the flexible display being one of: (i) scrolled up inside of the first housing; and (ii) rolled back providing a back display on the back side of the first housing; and
  - in response to determining that the eye gaze direction has at least partially traversed the first portion of the visual content towards one of a translatable edge of the flexible display support structure or an opposite edge of the first housing in a direction of an undisplayed second portion:
    - triggering the translation mechanism to extend the flexible display support structure; and
    - presenting the first portion and a second portion of the visual content on the flexible display.

20. The computer program product of claim 19, wherein the program code enables the electronic device to provide functionality of:
- in response to determining that the flexible display support structure is oriented to move vertically relative to the first housing:
  - determining that the gaze has at least partially traversed the first portion of the visual content based on identifying a beginning eye gaze direction toward one of an upper portion or a lower portion of the flexible display and an ending eye gaze direction toward the other one of the upper portion or the lower portion lower portion of the flexible display; and
  - subsequent to triggering the translation mechanism to extend the flexible display support structure:
    - maintaining presentation of the first portion of the visual content at the one of the upper portion or the lower portion of the beginning eye gaze direction; and
    - presenting the second portion of the visual content on the other one of the upper portion or the lower portion of the flexible display corresponding to the ending eye gaze direction.

\* \* \* \* \*